US012567223B2

(12) United States Patent
Dong

(10) Patent No.: US 12,567,223 B2
(45) Date of Patent: Mar. 3, 2026

(54) IMAGE ALIGNMENT METHOD AND DEVICE

(71) Applicant: BEIJING ZITIAO NETWORK TECHNOLOGY CO., LTD., Beijing (CN)

(72) Inventor: Hang Dong, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 288 days.

(21) Appl. No.: 18/562,821

(22) PCT Filed: May 19, 2022

(86) PCT No.: PCT/CN2022/093799
§ 371 (c)(1),
(2) Date: Nov. 20, 2023

(87) PCT Pub. No.: WO2022/242713
PCT Pub. Date: Nov. 24, 2022

(65) Prior Publication Data
US 2024/0273852 A1        Aug. 15, 2024

(30) Foreign Application Priority Data
May 21, 2021    (CN) .......................... 202110557632.8

(51) Int. Cl.
*G06V 10/24*        (2022.01)
*G06V 10/74*        (2022.01)
(Continued)

(52) U.S. Cl.
CPC ............ *G06V 10/24* (2022.01); *G06V 10/761* (2022.01); *G06V 10/7715* (2022.01); *G06V 10/82* (2022.01)

(58) Field of Classification Search
CPC .. G06V 10/24; G06V 10/7715; G06V 10/761; G06V 10/82
See application file for complete search history.

(56) References Cited

U.S. PATENT DOCUMENTS 10,825,190 B2 *  11/2020  Noji .......................... G06T 7/12
2016/0117797 A1   4/2016  Li et al.
2021/0241470 A1   8/2021  Tang et al.

FOREIGN PATENT DOCUMENTS

CN        103400393 A    11/2013
CN        104599288 A     5/2015
(Continued)

OTHER PUBLICATIONS

Park et al, "Look Wider to Match Image Patches with Convolutional Neural Networks", 2017, arXiv:1709.06248v1 [cs.CV] (5 Pages ) (Year: 2017).*
(Continued)

*Primary Examiner* — David F Dunphy
(74) *Attorney, Agent, or Firm* — Astute IP Law Group

(57)        ABSTRACT
An image alignment method and device, relating to the technical field of image processing. The method comprises: obtaining a target feature comprising feature points corresponding to pixel points in a target image and a reference feature comprising feature points corresponding to pixel points in a reference image; obtaining a similarity feature according to the target feature and the reference feature, the similarity feature comprising the similarity between the feature points in the target feature and a corresponding related feature point; predicting a convolutional layer according to the similarity feature, the target feature, and an offset, and obtaining an offset of the target feature and the reference feature; and aligning the reference feature with the target feature according to the offset and the deformable convolutional layer.

20 Claims, 6 Drawing Sheets

(51) Int. Cl.
   *G06V 10/77*      (2022.01)
   *G06V 10/82*      (2022.01)

(56) References Cited

FOREIGN PATENT DOCUMENTS

| | | | |
|---|---|---|---|
| CN | 107454330 | A | 12/2017 |
| CN | 107527360 | A | 12/2017 |
| CN | 107633526 | A | 1/2018 |
| CN | 110070511 | A | 7/2019 |
| CN | 111914878 | A | 11/2020 |
| CN | 111915484 | A | 11/2020 |
| CN | 112529846 | A | 3/2021 |
| WO | 2016177259 | A1 | 11/2016 |

OTHER PUBLICATIONS

Chan et al, "Understanding Deformable Alignment in Video Super-Resolution", May 18, 2021, vol. 35 No. 2: AAAI-21 Technical Tracks 2 / AAAI Technical Track on Computer Vision I, pp. 973-981 (Year: 2021).*

Notice of Allowance for Chinese Patent Application No. 202110557632.8, mailed on Oct. 31, 2024, 8 pages.

International Search Report (with English translation) issued in PCT/CN2022/093799, dated Aug. 19, 2022, 7 pages provided.

Written Opinion (with English translation) issued in PCT/CN2022/093799, dated Aug. 19, 2022, 6 pages provided.

Author: dadaHaHa1234, Explanation of PCD module for feature alignment, pubished Apr. 24, 2020, with English translation, https://blog.csdn.net/qq_32425195/article/details/105723175.

Office Action for Chinese Patent Application No. 202110557632.8, mailed Jun. 20, 2024, 15 pages.

Ye et al., "Fast and Robust Matching for Multimodal Remote Sensing Image Registration", IEEE Transactions on Geoscience and Remote Sensing, 2019, 15 pages.

Zhan et al., "Research on Mosaic Technology of Road Capture Image Based on Feature Points", 2019, 82 pages, with English translation of Abstract.

* cited by examiner obtaining a target feature and a reference feature ~S101 obtaining a similarity feature according to the target feature and the reference feature ~S102 obtaining an offset between the target feature and the reference feature according to the similarity feature, the target feature, and an offset prediction convolutional layer ~S103 aligning the reference image with the target image according to the offset and a deformable convolutional layer ~S104

Fig. 1

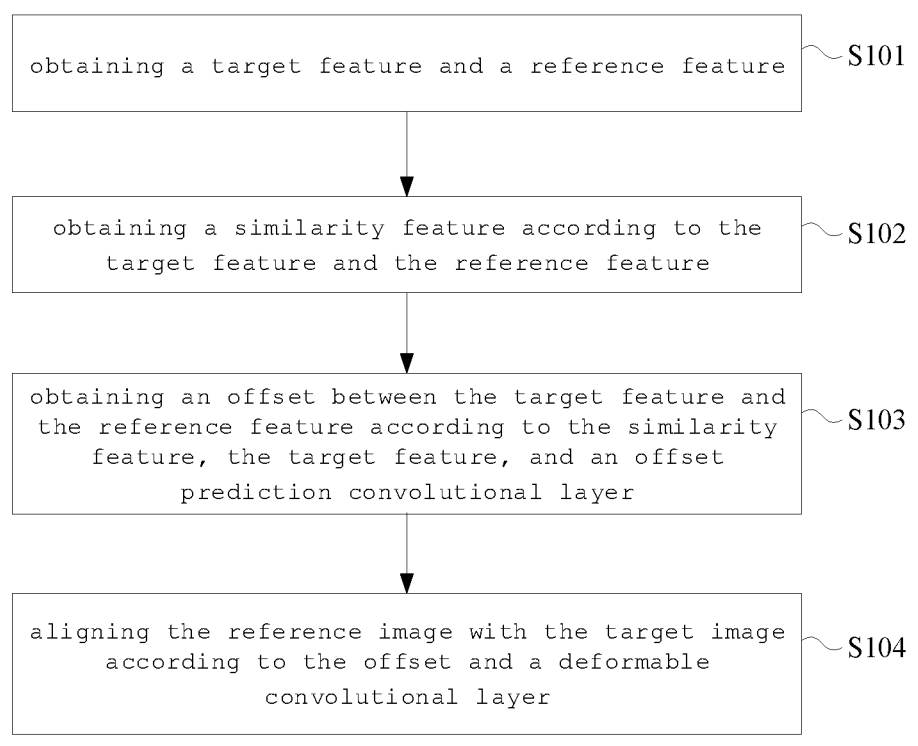

Fig. 2

| Fa11 | Fa12 | Fa13 | Fa14 | Fa15 | Fa16 |
|------|------|------|------|------|------|
| Fa21 | Fa22 | Fa23 | Fa24 | Fa25 | Fa26 |
| Fa31 | Fa32 | Fa33 | Fa34 | Fa35 | Fa36 |
| Fa41 | Fa42 | Fa43 | Fa44 | Fa45 | Fa46 |
| Fa51 | Fa52 | Fa53 | Fa54 | Fa55 | Fa56 |
| Fa61 | Fa62 | Fa63 | Fa64 | Fa65 | Fa66 |

31

| Fb11 | Fb12 | Fb13 | Fb14 | Fb15 | Fb16 |
|------|------|------|------|------|------|
| Fb21 | Fb22 | Fb23 | Fb24 | Fb25 | Fb26 |
| Fb31 | Fb32 | Fb33 | Fb34 | Fb35 | Fb36 |
| Fb41 | Fb42 | Fb43 | Fb44 | Fb45 | Fb46 |
| Fb51 | Fb52 | Fb53 | Fb54 | Fb55 | Fb56 |
| Fb61 | Fb62 | Fb63 | Fb64 | Fb65 | Fb66 |

32

| Fa11 | Fa12 | Fa13 | Fa14 | Fa15 | Fa16 |
|------|------|------|------|------|------|
| Fa21 | Fa22 | Fa23 | Fa24 | Fa25 | Fa26 |
| Fa31 | Fa32 | Fa33 | Fa34 | Fa35 | Fa36 |
| Fa41 | Fa42 | Fa43 | Fa44 | Fa45 | Fa46 |
| Fa51 | Fa52 | Fa53 | Fa54 | Fa55 | Fa56 |
| Fa61 | Fa62 | Fa63 | Fa64 | Fa65 | Fa66 |

41

400

| Fa22 | Fa23 | Fa24 |
|------|------|------|
| Fa32 | Fa33 | Fa34 |
| Fa42 | Fa43 | Fa44 |

900

IMAGE ALIGNMENT METHOD AND DEVICE

CROSS-REFERENCE TO RELATED APPLICATIONS

The present application is based on and claims the priority to the Chinese Patent Application No. 202110557632.8 filed on May 21, 2021, the disclosure of which is incorporated herein in its entirety.

TECHNICAL FIELD

The present disclosure relates to the technical field of image processing, and in particular, to an image alignment method and apparatus.

BACKGROUND

Image alignment refers to: a process of determining a variation parameter between a reference image and a target image, and deforming the target image into a same spatial layout as the reference image according to the variation parameter. The image alignment is widely applied to fields such as video restoration, image fusion, image splicing, and target identification. For example: in the video restoration, by aligning adjacent image frames, more detailed information of the image frames can be obtained by effectively utilizing information between the adjacent image frames, so that a clear and more detailed video is obtained.

A conventional image alignment method is: calculating an optical flow field between a target image and a reference image, taking the optical flow field as a dense registration relation between the target image and the reference image, and finally aligning the target image to the reference image by means of back-warping.

SUMMARY

Embodiments of the present disclosure provide the following technical solutions:

In a first aspect, an embodiment of the present disclosure provides an image alignment method, comprising:

obtaining a target feature and a reference feature, the target feature comprising feature points corresponding to pixel points in a target image, and the reference feature comprising feature points corresponding to pixel points in a reference image;

obtaining a similarity feature according to the target feature and the reference feature, the similarity feature comprising similarity between each feature point in the target feature and corresponding related feature points, and the related feature points corresponding to the feature point in the target feature comprising feature points in the reference feature that have pixel coordinates the same as and adjacent to a pixel coordinate of the feature point in the target feature;

obtaining an offset between the target feature and the reference feature according to the similarity feature, the target feature, and an offset prediction convolutional layer; and aligning the reference image with the target image according to the offset and a deformable convolutional layer.

As an alternative implementation of the embodiment of the present disclosure, related feature points corresponding to a first feature point in the target feature comprise a second feature point and feature points in a neighborhood of a first preset value of the second feature point, wherein the second feature point is a feature point in the reference feature that has the same pixel coordinate as the first feature point.

As an alternative implementation of the embodiment of the present disclosure, the obtaining a similarity feature according to the target feature and the reference feature comprises:

determining a first spatial domain corresponding to a third feature point in the target feature, the first spatial domain being a spatial domain formed by the third feature point and feature points in a neighborhood of a second preset value of the third feature point;

determining a second spatial domain corresponding to a fourth feature point in the reference feature, the second spatial domain being a spatial domain formed by the fourth feature point and feature points in a neighborhood of a second preset value of the fourth feature point, and the fourth feature point being a related feature point corresponding to the third feature;

calculating an outer product of feature points in each feature group to obtain an outer product of each feature group, the feature group comprising a feature point belonging to the first spatial domain and a feature point belonging to the second spatial domain, and a position of the feature point belonging to the first spatial domain in the first spatial domain being the same as that of the feature point belonging to the second spatial domain in the second spatial domain; and summing the outer products of the feature groups to obtain similarity between the third feature point and the fourth feature point.

As an alternative implementation of the embodiment of the present disclosure, the target feature is a feature obtained by performing feature extraction on the pixel points in the target image, and the reference feature is a feature obtained by performing feature extraction on the pixel points in the reference image;

or the target feature is a feature obtained by performing feature extraction on the pixel points in the target image and performing down-sampling on the extracted feature at a preset down-sampling rate; and the reference feature is a feature obtained by performing feature extraction on the pixel points in the reference image and performing down-sampling on the extracted feature at the preset down-sampling rate.

As an alternative implementation of the embodiment of the present disclosure, the obtaining an offset between the target feature and the reference feature according to the similarity feature, the target feature, an and offset prediction convolutional layer comprises:

cascading the similarity feature and the target feature on a dimension of a channel to obtain an offset prediction feature;

inputting the offset prediction feature into the offset prediction convolutional layer; and obtaining an output of the offset prediction convolutional layer as the offset between the target feature and the reference feature.

As an alternative implementation of the embodiment of the present disclosure, the target feature comprises sub-target features of a plurality of spatial scales, the reference feature comprises sub-reference features of the plurality of spatial scales, and the similarity feature comprises sub-similarity features of the plurality of spatial scales; and the obtaining an offset between the target feature and the reference feature according to the similarity feature, the target feature, and an offset prediction convolutional layer comprises:

obtaining sub-offsets between the sub-target features and the sub-reference features of the plurality of spatial scales according to the sub-similarity features of the plurality of spatial scales, the sub-target features of the plurality of spatial scales, and corresponding offset prediction convolutional layers of the plurality of spatial scales.

As an alternative implementation of the embodiment of the present disclosure, the aligning the reference image with the target image according to the offset and a deformable convolutional layer comprises:

inputting the reference feature into the deformable convolutional layer, and controlling a shape of a convolution kernel of the deformable convolutional layer by the offset;

obtaining an output of the deformable convolutional layer as an alignment result of the reference feature and the target feature; and aligning the reference image with the target image according to the alignment result of the reference feature and the target feature.

As an alternative implementation of the embodiment of the present disclosure, the target feature comprises sub-target features of a plurality of spatial scales, the reference feature comprises sub-reference features of the plurality of spatial scales, and the offset comprises sub-offsets of the plurality of spatial scales; and the aligning the reference image with the target image according to the offset and a deformable convolutional layer comprises:

obtaining alignment results of the sub-target features and the sub-reference features of the plurality of spatial scales according to the sub-offsets of the plurality of spatial scales and corresponding deformable convolutional layers of the plurality of spatial scales; and aligning the reference image with the target image according to the alignment results of the sub-target features and the sub-reference features of the plurality of spatial scales.

As an alternative implementation of the embodiment of the present disclosure, the reference image is an nth image frame of a video to be restored, and the reference image is an (n+1)th image frame of the video to be restored, where n is a positive integer.

In a second aspect, an embodiment of the present disclosure provides an image alignment apparatus, comprising:

a feature obtaining unit configured to obtain a target feature and a reference feature, the target feature comprising feature points corresponding to pixel points in a target image, and the reference feature comprising feature points corresponding to pixel points in a reference image;

a similarity obtaining unit configured to obtain a similarity feature according to the target feature and the reference feature, the similarity feature comprising similarity between each feature point in the target feature and corresponding related feature points, the related feature points corresponding to the feature point in the target feature comprising feature points in the reference feature that have pixel coordinates the same as and adjacent to a pixel coordinate of the feature point in the target feature;

an offset obtaining unit configured to obtain an offset between the target feature and the reference feature according to the similarity feature, the target feature, and an offset prediction convolutional layer; and a processing unit configured to align the reference image with the target to the offset and a deformable convolutional layer.

As an alternative implementation of the embodiment of the present disclosure, related feature points corresponding to a first feature point in the target feature comprise a second feature point and feature points in a neighborhood of a first preset value of the second feature point, wherein the second feature point is a feature point in the reference feature that has the same pixel coordinate as the first feature point.

As an alternative implementation of the embodiment of the present disclosure, the similarity obtaining unit is specifically configured to determine a first spatial domain corresponding to a third feature point in the target feature, the first spatial domain being a spatial domain formed by the third feature point and feature points in a neighborhood of a second preset value of the third feature point; determine a second spatial domain corresponding to a fourth feature point in the reference feature, the second spatial domain being formed by the fourth feature point and feature points in a neighborhood of a second preset value of the fourth feature point, the fourth feature point being a related feature point corresponding to the third feature; calculate an outer product of feature points in each feature group to obtain an outer product of each feature group, the feature group comprising a feature point belonging to the first spatial domain and a feature point belonging to the second spatial domain, and a position of the feature point belonging to the first spatial domain in the first spatial domain being the same as that of the feature point belonging to the second spatial domain in the second spatial domain; and sum the outer products of the feature groups to obtain similarity between the third feature point and the fourth feature point.

As an alternative implementation of the embodiment of the present disclosure, the target feature is a feature obtained by performing feature extraction on the pixel points in the target image, and the reference feature is a feature obtained by performing feature extraction on the pixel points in the reference image;

or the target feature is a feature obtained by performing feature extraction on the pixel points in the target image and performing down-sampling on the extracted feature at a preset down-sampling rate; and the reference feature is obtained by performing feature extraction on the pixel points in the reference image and performing down-sampling on the extracted feature at the preset down-sampling rate.

As an alternative implementation of the embodiment of the present disclosure, the offset obtaining unit is specifically configured to cascade the similarity feature and the target feature on a dimension of a channel to obtain an offset prediction feature; input the offset prediction feature into the offset prediction convolutional layer; and obtain an output of the offset prediction convolutional layer as the offset between the target feature and the reference feature.

As an alternative implementation of the embodiment of the present disclosure, the target feature comprises sub-target features of a plurality of spatial scales, the reference feature comprises sub-reference features of the plurality of spatial scales, and the similarity feature comprises sub-similarity features of the plurality of spatial scales; and

the offset obtaining unit is specifically configured to
obtain sub-offsets between the sub-target features and
the sub-reference features of the plurality of spatial
scales according to the sub-similarity features of the
plurality of spatial scales, the sub-target features of the
plurality of spatial scales, and corresponding offset
prediction convolutional layers of the plurality of spa-
tial scales.

As an alternative implementation of the embodiment of
the present disclosure, the processing unit is specifically
configured to input the reference feature into the deformable
convolutional layer, and control a shape of a convolution
kernel of the deformable convolutional layer by the offset;
and obtain an output of the deformable convolutional layer as
an alignment result of the reference feature and the
target feature.

As an alternative implementation of the embodiment of
the present disclosure, the target feature comprises sub-
target features of a plurality of spatial scales, the reference
feature comprises sub-reference features of the plurality of
spatial scales, and the offset comprises sub-offsets of the
plurality of spatial scales; and the processing unit is specifically configured to obtain
alignment results of the sub-target features and the
sub-reference features of the plurality of spatial scales
according to the sub-offsets of the plurality of spatial
scales and corresponding deformable convolutional
layers of the plurality of spatial scales; and align the
reference image with the target image according to the
alignment results of the sub-target features and the
sub-reference features of the plurality of spatial scales.

As an alternative implementation of the embodiment of
the present disclosure, the reference image is an nth image
frame of a video to be restored, and the reference image is
an (n+1)th image frame of the video to be restored, where n
is a positive integer.

In a third aspect, an embodiment of the present disclosure
provides an electronic device, comprising: a memory and a
processor, the memory being configured to store a computer
program, and the processor being configured to, when the
computer program is invoked, cause the electronic device to
implement the image alignment method according to the
first aspect or any of the alternative implementations of the
first aspect.

In a fourth aspect, the present disclosure provides a
computer-readable storage medium having thereon stored a
computer program which, when the computer program is
executed by a computing device, cause the computing
device to implement the image alignment method according
to the first aspect or any of the alternative implementations
of the first aspect.

In a fifth aspect, the present disclosure provides a com-
puter program product which, when running on a computer,
causes the computer to implement the image alignment
method according to the first aspect or any of the alternative
implementations of the first aspect.

BRIEF DESCRIPTION OF THE DRAWINGS

The accompanying drawings herein, which are incorpo-
rated in and constitute a part of this specification, illustrate
embodiments consistent with the present disclosure and,
together with the description, serve to explain the principles
of the present disclosure.

In order to more clearly illustrate the embodiments of the
present disclosure or technical solutions in the related art, the drawings that need to be used in the description of the
embodiments or related art will be briefly described below,
and it is obvious that for those of ordinary skill in the art,
other drawings can also be obtained according to these
drawings without paying out creative efforts.

Figures 3, 4:
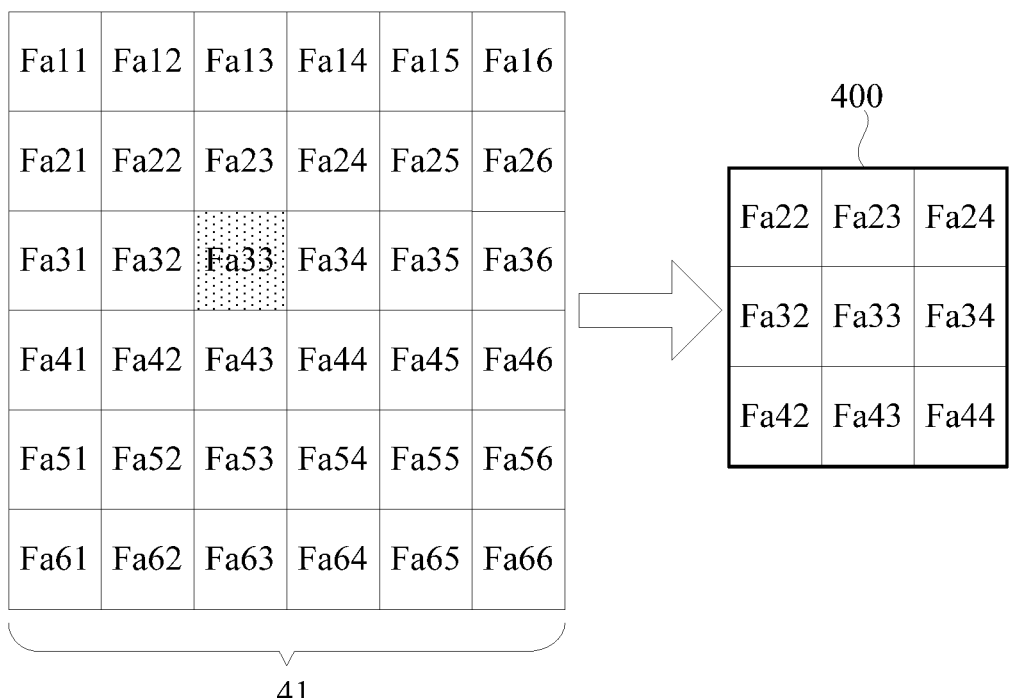
Figure 5:
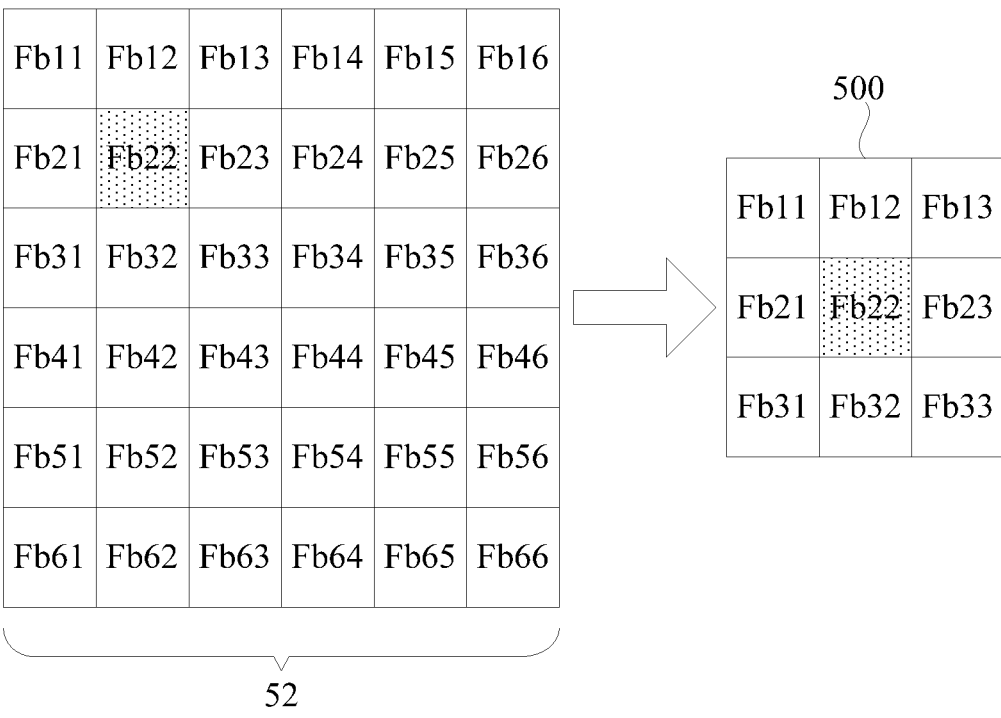
Figure 6:
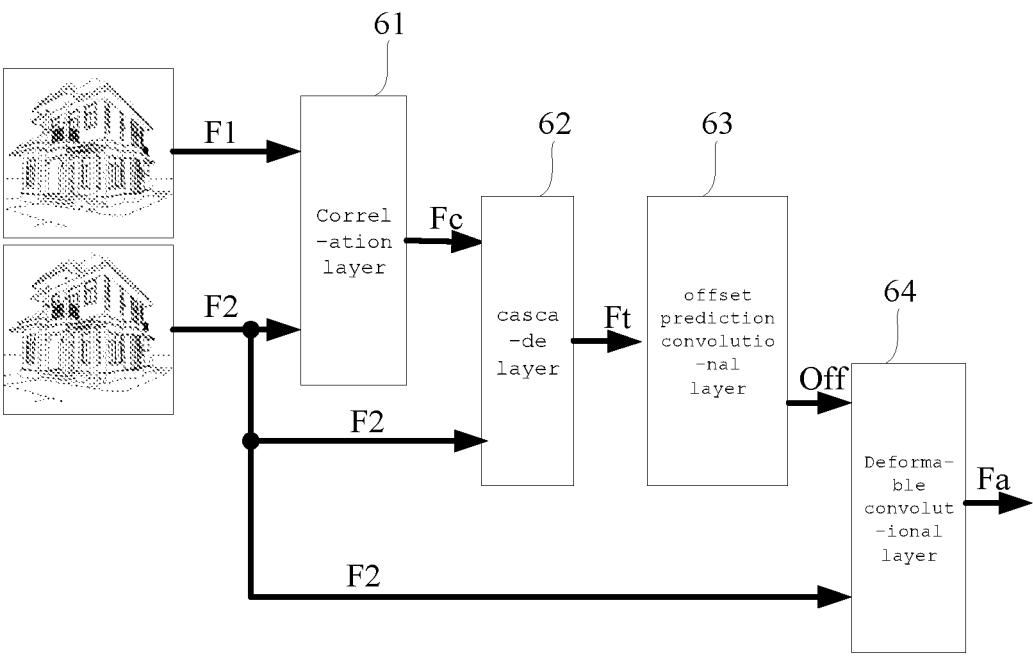
Figure 7:
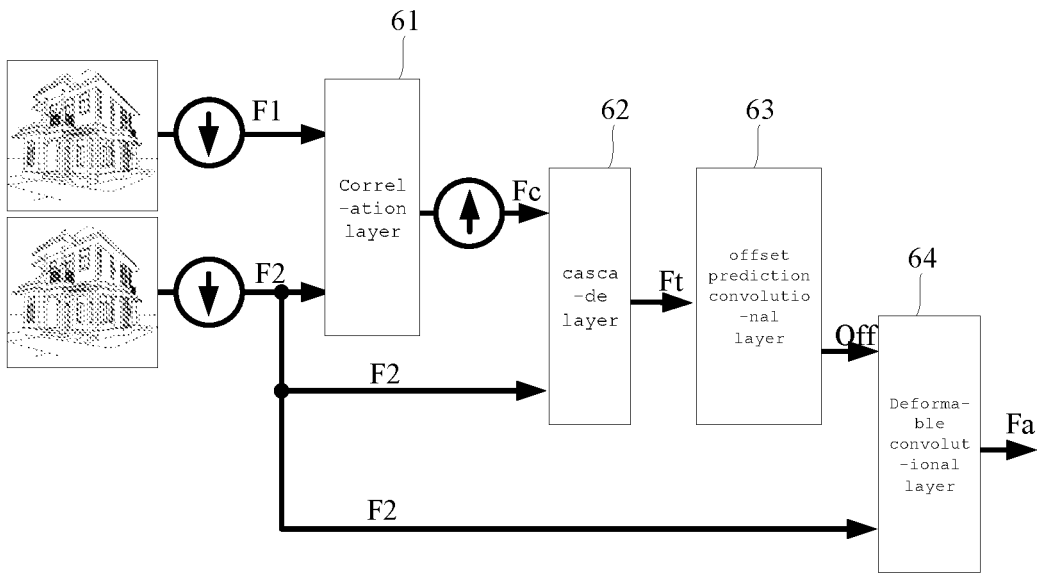
Figure 8:
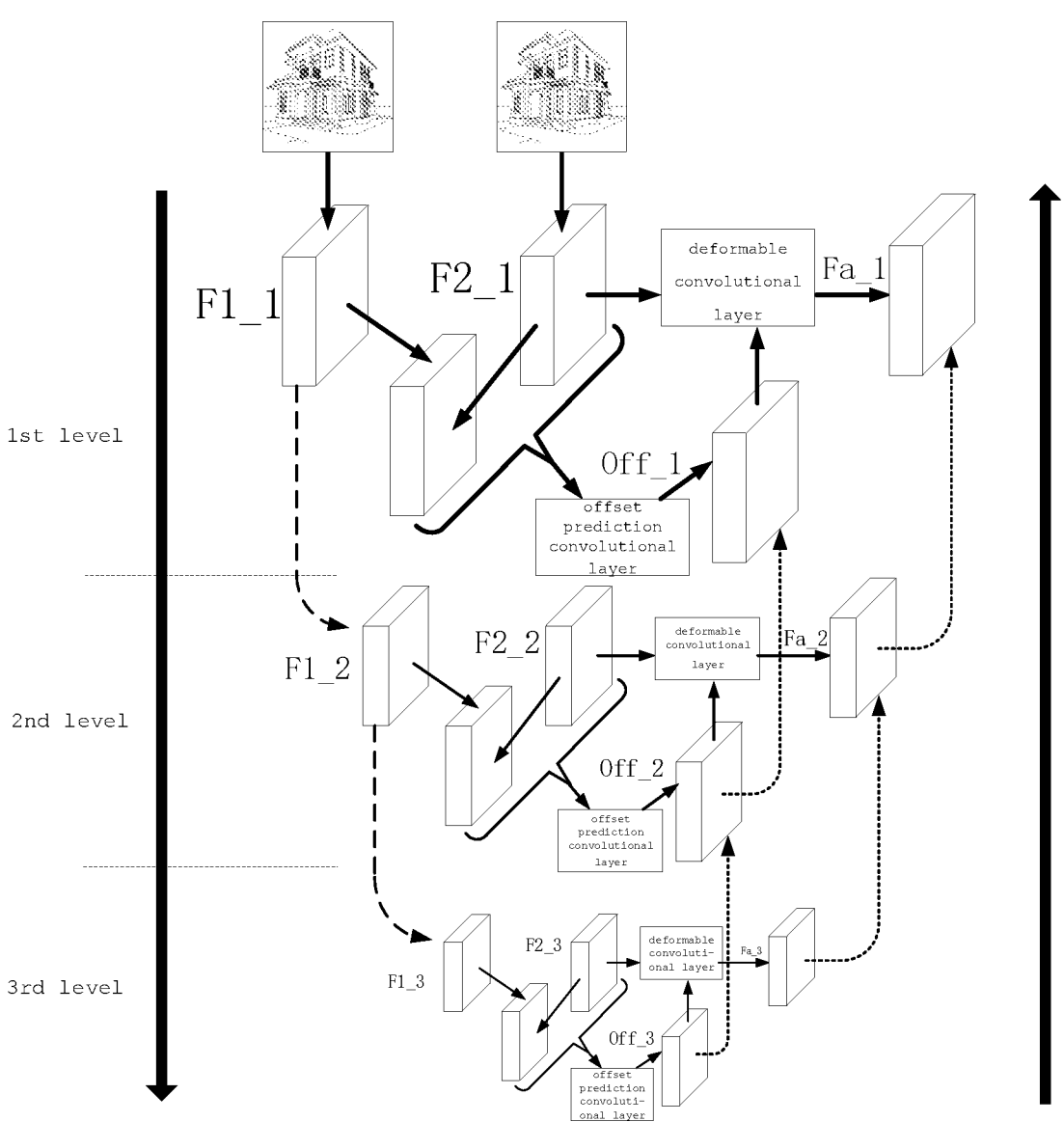
Figure 9:
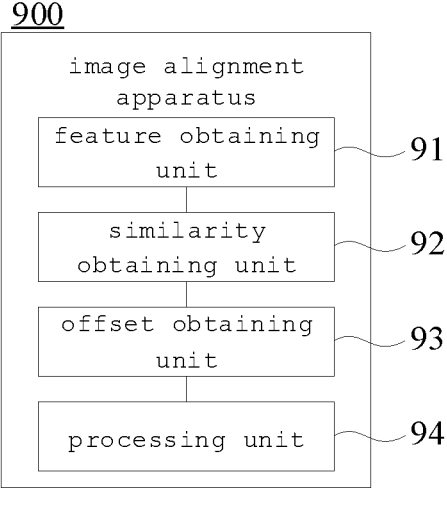
Figure 10:
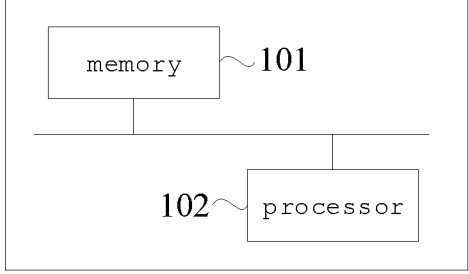

FIG. 1 is a flow diagram of steps of an image alignment
method according to an embodiment of the present disclo-
sure;

FIG. 2 is a first schematic diagram of related feature
points corresponding to a feature point according to an
embodiment of the present disclosure;

FIG. 3 is a second schematic diagram of related feature
points corresponding to a feature point according to an
embodiment of the present disclosure;

FIG. 4 is a schematic diagram of a first spatial domain
corresponding to a feature point according to an embodi-
ment of the present disclosure;

FIG. 5 is a schematic diagram of a second spatial domain
corresponding to a feature point according to an embodi-
ment of the present disclosure;

FIG. 6 is a first schematic flow diagram of an image
alignment method according to an embodiment of the pres-
ent disclosure;

FIG. 7 is a second schematic flow diagram of an image
alignment method according to an embodiment of the pres-
ent disclosure;

FIG. 8 is a third schematic flow diagram of an image
alignment method according to an embodiment of the pres-
ent disclosure;

FIG. 9 is a schematic diagram of an image processing
apparatus according to an embodiment of the present dis-
closure;

FIG. 10 is a schematic diagram of a hardware structure of
an electronic device according to an embodiment of the
present disclosure.

DETAILED DESCRIPTION

In order that the above features and advantages of the
present disclosure may be more clearly understood, the
solutions of the present disclosure will be further described
below. It should be noted that, in the case of no conflict, the
embodiments of the present disclosure and the features in
the embodiments may be combined with each other.

In the following description, numerous specific details are
set forth in order to provide thorough understanding of the
present disclosure, but the present disclosure may be imple-
mented in other ways different from those described herein;
and it is obvious that the embodiments in the description are
only some embodiments of the present disclosure, rather
than all embodiments.

In the embodiments of the present disclosure, words such
as "exemplary" or "for example" are used for indicating an
example, instance, or illustration. Any embodiment or
design solution described as "exemplary" or "for example"
in the embodiments of the present disclosure should not be
construed as preferred or advantageous over other embodi-
ments or design solutions. Rather, use of the word "exem-
plary" or "for example" is intended to present related
concepts in a specific way. Furthermore, in the description of
the embodiments of the present disclosure, the meaning of
"a plurality" refers to two or more unless otherwise speci-
fied.

Although image alignment can also be realized by means
of a conventional optical flow-based image alignment
method, a calculation amount in calculating an optical flow
field is so great that the image alignment is inefficient. In order to improve the problem of inefficiency in the image alignment, in the related art, a feature-based image alignment method is provided, which specifically comprises: obtaining a reference feature of a reference image and a target feature of a target image, then predicting an offset according to the reference feature and the target feature, and then aligning the reference feature with the target feature through offset control based on a deformable convolutional layer, thereby obtaining a final alignment result. Compared with the optical flow-based image alignment method, the above feature-based image alignment method does not need to calculate the optical flow field and thus is more efficient, and can realize direct alignment between the image features; however, for lack of an initial value when an offset is predicted according to the reference feature and the target feature, the alignment result of the deformable convolutional layer will greatly differ from a true value of the alignment result when the reference image and the target image have poor image quality.

In view of this, the present disclosure provides an image alignment method and apparatus, for solving the problem in the related art that there lacks an initial value in offset prediction, resulting in a great difference between the alignment result of the deformable convolutional layer and the true value of the alignment result.

A general inventive concept of the embodiments of the present disclosure is that: in a practical application process, when there is severe degradation (blurring, hazy and noise) in an input image to the deformable convolutional layer, the alignment result of the deformable convolutional layer is very instable to be prone to a gradient explosion phenomenon. A root of the instability lies in uncertainty of an initial value of an offset in an initial stage of training, resulting in a great difference between the offset predicted in the initial stage and an actual true value. Therefore, in order to stabilize this training process, in the embodiments of the present disclosure, a correlation layer in an optical flow network is introduced, and a similarity feature of the target feature and the reference feature that is obtained from the correlation layer is taken as a guidance for the offset. Because the similarity feature has a close relation with the optical flow, the problem of the great difference between the offset predicted in the initial stage and the actual true value can be improved by the guidance of the similarity feature.

An embodiment of the present disclosure provides an image alignment method, as shown in FIG. 1, the image alignment method comprising:

S101, obtaining a target feature and a reference feature.

Wherein the target feature comprises feature points corresponding to pixel points in a target image; and the reference feature comprises feature points corresponding to pixel points in the reference image.

Alternatively, the target feature and the reference feature may be adjacent image frames in a video. That is, the reference image is an nth image frame of a video to be restored, and the reference image is an (n+1)th image frame of the video to be restored, where n is a positive integer.

S102, obtaining a similarity feature according to the target feature and the reference feature.

Wherein the similarity feature comprises: similarity between each feature point in the target feature and corresponding related feature points, the related feature points corresponding to the feature point in the target feature comprising feature points in the reference feature that have pixel coordinates the same as and adjacent to a pixel coordinate of the feature point in the target feature.

Specifically, in the embodiment of the present disclosure, the pixel coordinate of the feature point refers to a pixel coordinate of a pixel point corresponding to the feature point in an image to which the pixel point belongs.

For example: if a feature point corresponding to a pixel point $I_{11}$ having a pixel coordinate of $(1, 1)$ in the reference image is $F_{a11}$, a pixel coordinate of the feature point $F_{a11}$ is $(1, 1)$.

For another example: if a feature point corresponding to a pixel point $I_{23}$ having a pixel coordinate of $(2, 3)$ in the target image is $F_{b23}$, a pixel coordinate of the feature point $F_{b23}$ is $(2, 3)$.

It should be noted that, the pixel coordinate and the pixel coordinate in the embodiments of the present disclosure refer to that, two pixels belong to one preset coordinate range and are defined between the two pixel coordinates without including another pixel coordinate.

As an alternative implementation of the embodiment of the present disclosure, related feature points corresponding to a first feature point in the target feature comprise a second feature point and feature points in a neighborhood of a first preset value of the second feature point;

wherein the second feature point is a feature point in the reference feature that has the same pixel coordinate as the first feature point.

Assuming that the first preset value is d, the related feature points corresponding to the first feature point comprise a second feature point in the reference feature that has the same pixel coordinate as the first feature point, and feature points in a neighborhood of d*d of the second feature point.

Exemplarily, d may be 9. Namely, the related feature points corresponding to the first feature point comprise a second feature point in the reference feature that has the same pixel coordinate as the first feature point, and feature points in a neighborhood of 9*9 of the second feature point.

Exemplarily, reference is made to FIG. 2, where an example that the target image and the reference image both have resolution of 6*6 and the first preset value is 3 is taken, to describe the related feature points corresponding to the feature point in the target feature. As shown in FIG. 2, a feature point Fa33 in a target feature 21 has a pixel coordinate of $(3, 3)$, and a feature point in a reference feature 22 that has a pixel coordinate of $(3, 3)$ is Fb33, so that when a first feature point is Fa33, a second feature point is Fb33, and feature points in a neighborhood of 3*3 of the second feature point Fb33 includes: Fb22, Fb23, Fb24, Fb32, Fb34, Fb42, Fb43, and Fb44, and thus related feature points corresponding to the feature point Fa33 in the target feature 21 include 9 feature points in the reference feature that are Fb22, Fb23, Fb24, Fb32, Fb33, Fb34, Fb42, Fb43, and Fb44, respectively.

Exemplarily, reference is made to FIG. 3, where an example that the target image and the reference image both have resolution of 6*6 and the first preset value is 3 is still taken, to describe the related feature points corresponding to the feature point in the target feature. As shown in FIG. 3, a feature point Fa46 in a target feature 31 has a pixel coordinate of $(4, 6)$, and a feature point in a reference feature 32 that has a pixel coordinate of $(4, 6)$ is Fb46, so that when a first feature point is Fa46, a second feature point is Fb46, and feature points in a neighborhood of 3*3 of the second feature point Fb46 includes: Fb35, Fb36, Fb45, Fb55, and Fb56, and thus related feature points corresponding to the feature point Fa46 in the target feature 21 include 6 feature points in the reference feature that are Fb35, Fb36, Fb45, Fb46, Fb55, and Fb56, respectively.

In the same way as described above, each feature point (Fa11, Fa12, Fa13 . . . Fa65, Fa66) in the target feature is taken as the first feature point one by one, and the related feature points corresponding to each feature point in the target feature can be determined.

In the above embodiment, the second feature point in the reference feature that has the same pixel coordinate as the first feature point and the feature points in the neighborhood of the first preset value of the second feature point are determined as the related feature points corresponding to the first feature point, and compared with the case that only the second feature point is determined as the related feature point corresponding to the first feature point, in the above embodiment, when the similarity feature is obtained, the receptive field of the similarity feature may be increased, and further, when the offset between the reference image and the target image has a large true value, the obtained similarity feature is inaccurate.

Further, in the above step S102, the obtaining a similarity feature according to the target feature and the reference feature comprises the following steps a to d.

Step a, determining a first spatial domain corresponding to a third feature point in the target feature.

The first spatial domain is a spatial domain formed by the third feature point and feature points in a neighborhood of a second preset value of the third feature point, the third feature point being any feature point of the target feature.

Assuming that a second preset value is k, the first spatial domain is a spatial domain formed by a third feature point and feature points in a neighborhood of k*k of the third feature point.

Exemplarily, reference is made to FIG. 4, where an example that the target image and the reference image both have resolution of 6*6 and the second preset value is 3 is taken, to describe the first spatial domain corresponding to the feature point in the target feature. As shown in FIG. 4, pixel points in a neighborhood of 3*3 of a feature point Fa33 in a target feature 41 include: Fa22, Fa23, Fa24, Fa32, Fa34, Fa42, Fa43, and Fa44, and thus a first spatial domain corresponding to the feature point Fa33 is a spatial domain 400 formed by Fa22, Fa23, Fa24, Fa32, Fa33, Fa34, Fa42, Fa43, and Fa44.

Step b, determining a second spatial domain corresponding to a fourth feature point in the reference feature.

The second spatial domain is a spatial domain formed by the fourth feature point and feature points in a neighborhood of a second preset value of the fourth feature point, the fourth feature point being a related feature point corresponding to the third feature.

Similarly, assuming that the second preset value is k, a second spatial domain is a spatial domain formed by a fourth feature point and feature points in a neighborhood of k*k of the fourth feature point.

Exemplarily, reference is made to FIG. 5, where an example that the target image and the reference image both have resolution of 6*6 and the second preset value is 3 is taken, to describe the second spatial domain corresponding to the feature point in the reference feature. As shown in FIG. 5, pixel points in a neighborhood of 3*3 of the related feature point Fa22 corresponding to the feature point Fa33 in the target feature 41 shown in FIG. 4 in a reference feature 52 include: Fb11, Fb12, Fb13, Fb21, Fb23, Fb31, Fb32, and Fb33, so that a second spatial domain corresponding to the feature point Fb22 is a spatial 500 formed by Fb11, Fb12, Fb13, Fb21, Fb22, Fb23, Fb31, Fb32, and Fb33.

Step c, calculating an outer product of feature points in each feature group to obtain an outer product of each feature group.

Wherein the feature group comprises a feature point belonging to the first spatial domain and a feature point belonging to the second spatial domain, and a position of the feature point belonging to the first spatial domain in the first spatial domain is the same as that of the feature point belonging to the second spatial domain in the second spatial domain.

The outer product in the embodiment of the present disclosure refers to a vector product of two feature vectors. For example, an outer product of a feature $\vec{a}$ and a feature $\vec{b}$ may be represented as: $\vec{a} \times \vec{b}$.

As shown in FIG. 4 and FIG. 5 described above, feature points with the same position in the spatial domain to which each feature point belongs include: Fa22 and Fb11, Fa23 and Fb12, Fa24 and Fb13, Fa32 and Fb21, Fa33 and Fb22, Fa34 and Fb23, Fa42 and Fb31, Fa43 and Fb32, Fa44 and Fb33, so that outer products of a feature group (Fa22, Fb11), a feature group (Fa23, Fb12), a feature group (Fa24, Fb13), a feature group (Fa32, Fb21), a feature group (Fa33, Fb22), a feature group (Fa34, Fb23), a feature group (Fa42, Fb31), a feature group (Fa43, Fb32), and a feature group (Fa44, Fb33) are calculated, to obtain Fa22×Fb11, Fa23×Fb12, Fa24×Fb13, Fa32×Fb21, Fa33×Fb22, Fa34×Fb23, Fa42× Fb31, Fa43×Fb32, Fa44×Fb33.

Step d, summing the outer products of the feature groups to obtain similarity between the third feature point and the fourth feature point.

As described in the above example, the outer products of the feature groups include: Fa22×Fb11, Fa23×Fb12, Fa24× Fb13, Fa32×Fb21, Fa33×Fb22, Fa34×Fb23, Fa42×Fb31, Fa43×Fb32, Fa44×Fb33, so that similarity between the third feature point Fa33 and the fourth feature point Fb22 is: Fa22×Fb11+Fa23×Fb12+Fa24×Fb13+Fa32×Fb21+Fa33× Fb22+Fa34×Fb23+Fa42×Fb31+Fa43×Fb32+Fa44×Fb33.

That is, for a feature point $x_1$ in the target feature and a feature point $x_2$ in the reference feature that is related to the feature point $x_1$, similarity between $x_1$ and $x_2$ can be obtained according to the following formula:

$$c(x_1, x_2) = \sum [f_1(x_1 + o) \times f_2(x_2 + o)];$$
$$o \in [-1/2k, \ 1/2k] \times [-1/2k, \ 1/2k].$$

where $c(x_1, x_2)$ is the similarity between the feature points $x_1$ and $x_2$, k is a constant, $f_1(x_1+0)$ represents $x_1$ and feature points in a neighborhood k*k of $x_1$, and $f_2(x_2+0)$ represents $x_2$ and feature points in a neighborhood k*k of $x_2$.

Based on the same method described above, by taking another related feature point corresponding to the third feature point as the fourth feature point one by one, similarity between the third feature point and the corresponding related feature point can be obtained, and by taking each feature point (Fa11, Fa12, Fa13 . . . Fa65, and Fa66) in the target feature as the third feature point one by one, the similarity between each feature point in the target feature and the corresponding related feature point is obtained, thereby obtaining the similarity feature.

In the above embodiment, when the similarity between the third feature point and the fourth feature point is calculated, the first spatial domain corresponding to the third feature point and the second spatial domain corresponding to the fourth feature point are determined first, then the outer product of the feature points in each feature group is calculated to obtain the outer product of each feature group, finally, the outer products of the feature groups are summed, and the summed result is used as the similarity between the third feature point and the fourth feature point. Compared with directly calculating an outer product of the third feature point and the fourth feature point and using the outer product of the third feature point and the fourth feature point as the similarity between the third feature point and the fourth feature point, a dimension of the obtained similarity can be increased by the above embodiment, thereby improving robustness in obtaining the similarity feature.

S103, obtaining an offset between the target feature and the reference feature according to the similarity feature, the target feature, and an offset prediction convolutional layer.

Alternatively, one implementation of the above step S103 includes the following steps 1 to 3:

Step 1, cascading the similarity feature and the target feature on a dimension of a channel to obtain an offset prediction feature.

In the embodiment of the present disclosure, the number of channels of a feature refers to the number of feature maps included in the feature, one channel of the feature being a feature map obtained by performing feature extraction on the feature based on a certain dimension, so that the channel of the feature is the feature map in a specific sense. The cascading the similarity feature and the target feature on a dimension of a channel to obtain an offset prediction feature is: sequentially cascading feature maps of the similarity feature and feature maps of the target feature, so as to obtain the offset prediction feature sequentially including all the feature maps of the target feature and all the feature maps of the similarity feature.

Step 2, inputting the offset prediction feature into the offset prediction convolutional layer.

Step 3, obtaining an output of the offset prediction convolutional layer as the offset between the target feature and the reference feature.

S104, aligning the reference image with the target image according to the offset and a deformable convolutional layer. Alternatively, one implementation of the above step S104 includes the following steps I to III:

Step I, inputting the reference feature into the deformable convolutional layer, and controlling a shape of a convolution kernel of the deformable convolutional layer by the offset.

Step II, obtaining an output of the deformable convolutional layer as an alignment result of the reference feature and the target feature.

Step III, aligning the reference image with the target image according to the alignment result of the reference feature and the target feature.

To sum up, if the reference feature is denoted as F1, the target feature is denoted as F2, the similarity feature is denoted as Fc, the offset prediction feature is denoted as Ft, the offset is denoted as Off, the alignment result is denoted as Fa, a module for obtaining the similarity feature is called a correlation layer, and a module for obtaining the offset prediction feature is denoted as a cascade layer, the flow of the image alignment method provided by the above embodiment is as shown in FIG. 6:

Firstly, the reference feature F1 and the target feature F2 are input to a correlation layer 61, and an output of the correlation layer 61 is obtained as the similarity feature Fc.

Secondly, the similarity feature Fc and the target feature F2 are input into a cascade layer 62, and an output of the cascade layer 62 is obtained as the offset prediction feature Ft.

Thirdly, the offset prediction feature Ft is input to an offset prediction convolutional layer 63, and an output of the offset prediction convolutional layer 63 is obtained as the offset Off.

Finally, the offset Off and the target feature F2 are input into a deformable convolutional layer 64, and an output of the deformable convolutional layer 64 is obtained as the alignment result Fa.

Further, assuming that the reference feature F1 and the target feature F2 have a feature dimension of C×H×W, the similarity feature Fc has a feature dimension of (d*d)×H×W, and the offset prediction feature Ft has a feature dimension of (d*d+C)×H×W, where d is a first preset value.

In the image alignment method provided by the embodiment of the present disclosure, firstly, a target feature comprising feature points corresponding to pixel points in a target image and a reference feature comprising feature points corresponding to pixel points in a reference image are obtained, then a feature of similarity between each feature point in the target feature and corresponding related feature points is obtained according to the target feature and the reference feature, and then an offset between the target feature and the reference feature is obtained according to the similarity feature, the target feature, and an offset prediction convolutional layer, and finally the reference image is aligned with the target image according to the offset and a deformable convolutional layer. Because the similarity between each feature point in the target feature and the corresponding related feature point has strong correlation with the optical flow field between the target image and the reference image, the offset between the target feature and the reference feature can be more accurately predicted by using the similarity feature as the guidance of the offset, thereby solving the problem of a great difference between the alignment result of the deformable convolutional layer and the true value of the alignment result.

As an alternative implementation of the embodiment of the present disclosure, the target feature is a feature obtained by performing feature extraction on the pixel points in the target image, and the reference feature is a feature obtained by performing feature extraction on the pixel points in the reference image.

That is, the images extracted from the target image and the reference image are used as the target feature and the reference feature, respectively.

As an alternative implementation of the embodiment of the present disclosure, the target feature is a feature obtained by performing feature extraction on the pixel points in the target image and performing down-sampling on the extracted feature at a preset down-sampling rate; and the reference feature is a feature obtained by performing feature extraction on the pixel points in the reference image and performing down-sampling on the extracted feature at the preset down-sampling rate.

Exemplarily, the preset down-sampling rate may be $\frac{1}{16}$.

That is, the feature extracted from the target image is down-sampled to $\frac{1}{16}$ of the original feature, which is used as the target feature, and the feature extracted from the reference image is down-sampled to $\frac{1}{16}$ of the original feature, which is used as the reference feature.

In the above embodiment, in the case where the first preset value is set to a large value, the offset prediction convolutional layer may obtain a sufficiently large receptive field, but at the same time, the calculation amount for calculating the similarity feature may also be increased, thereby affecting the image alignment efficiency. In order to solve the above problem, in the above embodiment, the feature extracted from the target image and the feature extracted from the target image are down-sampled at the preset down-sampling rate, so that it is possible to improve the excessive calculation amount of the similarity feature while ensuring a sufficiently large receptive field, thereby improving the image alignment efficiency.

In addition, after the target feature and the reference feature are down-sampled at the preset down-sampling rate and the similarity feature is obtained, since the similarity feature and the target feature need to be cascaded on the dimension of the channel to obtain the offset prediction feature and the dimension of the features cascaded on the dimension of the channel need to be the same, the similarity feature further needs to be up-sampled to a feature having the same dimension as the target feature. That is, referring to FIG. 7, based on the flow shown in FIG. 6, the image alignment method provided in the embodiment of the present disclosure further comprises: down-sampling the target feature F2 and the reference feature F1 (shown by a downward arrow in FIG. 7), and up-sampling the similarity feature (shown by an upward arrow in FIG. 7).

Further, in the embodiment of the present disclosure, a cascade pyramid architecture may also be employed to perform progressive alignment of the target feature and the reference feature from a plurality of different spatial scales.

That is, the target feature comprises sub-target features of the plurality of spatial scales, the reference feature comprises sub-reference features of the plurality of spatial scales, and the similarity feature comprises sub-similarity features of the plurality of spatial scales, and the above step S103 (obtaining an offset between the target feature and the reference feature according to the similarity feature, the target feature, and an offset prediction convolutional layer) comprises:

obtaining sub-offsets between the sub-target features and the sub-reference features of the plurality of spatial scales according to the sub-similarity features of the plurality of spatial scales, the sub-target features of the plurality of spatial scales, and corresponding offset prediction convolutional layers of the plurality of spatial scales.

Since the offset between the feature of the reference image and the feature of the target image is progressively obtained from the plurality of spatial scales in the above embodiment, the offset between the feature of the reference image and the feature of the target image can be obtained more accurately in the above embodiment.

The target feature comprises sub-target features of the plurality of spatial scales, the reference feature comprises sub-reference features of the plurality of spatial scales, and the offset comprises sub-offsets of the plurality of spatial scales, and the above step S104 (aligning the reference image with the target image according to the offset and a deformable convolutional layer) comprises:

obtaining alignment results of the sub-target features and the sub-reference features of the plurality of spatial scales according to the sub-offsets of the plurality of spatial scales and corresponding deformable convolutional layers of the plurality of spatial scales; and aligning the reference image with the target image according to the alignment results of the sub-target features and the sub-reference features of the plurality of spatial scales.

Since the reference image is progressively aligned with the target image from the plurality of spatial scales in the above embodiment, the accuracy of the alignment result of the reference image and the target image may be improved by the above embodiment.

Alternatively, the aligning the reference image with the target image according to the offset and a deformable convolutional layer comprises:

according to a sub-offset of an nth-level spatial scale and a sub-offset of an (n−1)th-level spatial scale, obtaining a target offset of the nth-level spatial scale;

according to the target offset of the nth-level spatial scale and a deformable convolutional layer corresponding to the nth-level spatial scale, obtaining an alignment result of the nth-level spatial scale;

according to the alignment result of the nth-level spatial scale and a target alignment result of the (n−1)th-level spatial scale, obtaining a target alignment result of the nth-level spatial scale; and according to a target alignment result of a 1st-level spatial scale, obtaining the alignment result of the reference image and the target image, wherein the (n−1)th-level spatial scale is less than the nth-level spatial scale.

Reference is made to FIG. 8, which illustrates an example of progressive alignment of the target feature and the reference feature from different spatial scales by employing a 3-level cascade pyramid architecture.

Firstly, sub-reference features F1_1, F1_2, and F1_3, and sub-target features F2_1, F2_2, and F2_3 are obtained from spatial scales corresponding to a 1st level, a 2nd level, and a 3rd level.

Secondly, starting from the 3rd-level spatial scale, by the image alignment method provided in the above embodiment, a sub-offset Off_3 between the sub-reference feature F1_1 and the sub-target feature F2_1 and an alignment result Fa_3 are obtained, and since the 3rd-level spatial scale does not include an upper-level spatial scale, the sub-offset Off_3 directly acts on a deformable convolutional layer corresponding to the 3rd-level spatial scale, and the alignment result of the 3rd-level spatial scale is the same as a target result thereof.

Thirdly, by the image alignment method provided in the above embodiment, a sub-offset Off_2 between the sub-reference feature F1_2 and the sub-target feature F2_2 of the 2nd-level spatial scale is obtained, and a target offset of the 2nd-level spatial scale is generated according to the sub-offset Off_3 and the sub-offset Off_2, then the target offset of the 2nd-level spatial scale is input into a deformable convolutional layer of the 2nd-level spatial scale, to obtain an alignment result Fa_2 of the 2nd-level, so that a target alignment result of the 2nd-level spatial scale is obtained by combining the alignment result Fa_2 and the target alignment result Fa_3 of the 3nd-level spatial scale.

Finally, by the image alignment method provided in the above embodiment, a sub-offset Off_1 between the sub-reference feature F1_1 and the sub-target feature F2_1 of the 1st-level spatial scale is obtained, and a target offset of the 1st-level spatial scale is generated according to the sub-offset Off_2 and the sub-offset Off_1, and then the target offset of the 1st-level spatial scale is input into a deformable convolutional layer of the 1st-level spatial scale to obtain an alignment result Fa_1 of the 1st-level, so that a target alignment result (final alignment result) of the 1st-level spatial scale is obtained by combining the alignment result Fa_1 and the target alignment result of the 2nd-level spatial scale.

It should be noted that FIG. 8 illustrates an example of the progressive alignment of the target feature and the reference feature from 3 different spatial scales, but the embodiments of the present disclosure are not limited thereto, and on the basis of the above embodiments, the progressive alignment of the target feature and the reference feature may also be performed from other numbers of different spatial scales. For example: the progressive alignment of the target feature and the reference feature is performed from 2 different spatial scales, from 5 different spatial scales, or the like, which is not limited in the embodiments of the present disclosure.

Based on the same inventive concept, as an implementation of the foregoing method, an embodiment of the present disclosure further provides an image alignment apparatus; the apparatus embodiment corresponds to the foregoing method embodiment, and for convenience of reading, details in the foregoing method embodiment are not repeated one by one in the apparatus embodiment, but it should be clear that the image alignment apparatus in this embodiment can correspondingly implement all the contents in the foregoing method embodiment.

An embodiment of the present disclosure provides an image alignment apparatus; FIG. 9 is a schematic structural diagram of an image alignment apparatus, as shown in FIG. 9, the image alignment apparatus 900 comprising:

a feature obtaining unit 91 configured to obtain a target feature and a reference feature, the target feature comprising feature points corresponding to pixel points in a target image, and the reference feature comprising feature points corresponding to pixel points in a reference image;

a similarity obtaining unit 92 configured to obtain a similarity feature according to the target feature and the reference feature, the similarity feature comprising similarity between each feature point in the target feature and corresponding related feature points, the related feature points corresponding to the feature point in the target feature comprising feature points in the reference feature that have pixel coordinates the same as and adjacent to a pixel coordinate of the feature point in the target feature;

an offset obtaining unit 93 configured to obtain an offset between the target feature and the reference feature according to the similarity feature, the target feature, and an offset prediction convolutional layer; and a processing unit 94 configured to align the reference image with the target image according to the offset and a deformable convolutional layer.

As an alternative implementation of the embodiment of the present disclosure, related feature points corresponding to a first feature point in the target feature comprise a second feature point and feature points in a neighborhood of a first preset value of the second feature point, wherein the second feature point is a feature point in the reference feature that has the same pixel coordinate as the first feature point.

As an alternative implementation of the embodiment of the present disclosure, the similarity obtaining unit 92 is specifically configured to determine a first spatial domain corresponding to a third feature point in the target feature, the first spatial domain being a spatial domain formed by the third feature point and feature points in a neighborhood of a second preset value of the third feature point; determine a second spatial domain corresponding to a fourth feature point in the reference feature, the second spatial domain being formed by the fourth feature point and feature points in a neighborhood of a second preset value of the fourth feature point, the fourth feature point being a related feature point corresponding to the third feature; calculate an outer product of feature points in each feature group to obtain an outer product of each feature group, the feature group comprising a feature point belonging to the first spatial domain and a feature point belonging to the second spatial domain, and a position of the feature point belonging to the first spatial domain in the first spatial domain being the same as that of the feature point belonging to the second spatial domain in the second spatial domain; and sum the outer products of the feature groups to obtain similarity between the third feature point and the fourth feature point.

As an alternative implementation of the embodiment of the present disclosure, the target feature is a feature obtained by performing feature extraction on the pixel points in the target image, and the reference feature is a feature obtained by performing feature extraction on the pixel points in the reference image;

or the target feature is a feature obtained by performing feature extraction on the pixel points in the target image and performing down-sampling on the extracted feature at a preset down-sampling rate; and the reference feature is a feature obtained by performing feature extraction on the pixel points in the reference image and performing down-sampling on the extracted feature at the preset down-sampling rate.

As an alternative implementation of the embodiment of the present disclosure, the offset obtaining unit 93 is specifically configured to cascade the similarity feature and the target feature on a dimension of a channel to obtain an offset prediction feature; input the offset prediction feature into the offset prediction convolutional layer; and obtain an output of the offset prediction convolutional layer as the offset between the target feature and the reference feature.

As an alternative implementation of the embodiment of the present disclosure, the target feature comprises sub-target features of a plurality of spatial scales, the reference feature comprises sub-reference features of the plurality of spatial scales, and the similarity feature comprises sub-similarity features of the plurality of spatial scales; and the offset obtaining unit 93 is specifically configured to obtain sub-offsets between the sub-target features and the sub-reference features of the plurality of spatial scales according to the sub-similarity features of the plurality of spatial scales, the sub-target features of the plurality of spatial scales, and corresponding offset prediction convolutional layers of the plurality of spatial scales.

As an alternative implementation of the embodiment of the present disclosure, the processing unit 94 is specifically configured to input the reference feature into the deformable convolutional layer, and control a shape of a convolution kernel of the deformable convolutional layer by the offset; and obtain an output of the deformable convolutional layer as an alignment result of the reference feature and the target feature.

As an alternative implementation of the embodiment of the present disclosure, the target feature comprises sub-target features of a plurality of spatial scales, the reference feature comprises sub-reference features of the plurality of spatial scales, and the offset comprises sub-offsets of the plurality of spatial scales; and the processing unit 94 is specifically configured to obtain alignment results of the sub-target features and the sub-reference features of the plurality of spatial scales according to the sub-offsets of the plurality of spatial scales and corresponding deformable convolutional layers of the plurality of spatial scales; and align the reference image with the target image according to the alignment results of the sub-target features and the sub-reference features of the plurality of spatial scales.

As an alternative implementation of the embodiment of the present disclosure, the reference image is an nth image frame of a video to be restored, and the reference image is an (n+1)th image frame of the video to be restored, where n is a positive integer.

The image alignment apparatus provided in this embodiment may perform the image alignment method provided in the above method embodiments, and the implementation principle and the technical effect thereof are similar to those of the image alignment method, which are not repeated herein.

Based on the same inventive concept, an embodiment of the present disclosure also provides an electronic device. FIG. 10 is a schematic structural diagram of an electronic device provided in an embodiment of the present disclosure, as shown in FIG. 10, the electronic device provided in this embodiment comprising: a memory 101 and a processor 102, the memory 101 being configured to store a computer program, and the processor 102 being configured to perform, when the computer program is invoked, the image alignment method provided in the above embodiments.

An embodiment of the present disclosure further provides a computer-readable storage medium having thereon stored a computer program which, when executed by a processor, causes the computing device to implement the image alignment method provided in the above embodiments.

An embodiment of the present disclosure further provides a computer program product which, when running on a computer, causes the computer to implement the image alignment method provided in the above embodiments.

It should be appreciated by those skilled in the art that, the embodiments of the present disclosure may be provided as a method, a system, or a computer program product. Accordingly, the present disclosure may take a form of an entire hardware embodiment, an entire software embodiment, or an embodiment combining software and hardware aspects. Moreover, the present disclosure may take a form of a computer program product implemented on one or more computer-usable storage media having computer-usable program code embodied therein.

The processor may be a central processing unit (CPU), or the processor may be another general-purpose processor, digital signal processor (DSP), application specific integrated circuit (ASIC), field-programmable gate array (FPGA) or other programmable logic devices, a discrete gate or transistor logic device, a discrete hardware component, etc. The general-purpose processor may be a microprocessor or any conventional processor or the like.

The memory may include a non-permanent memory, a random access memory (RAM), and/or a non-volatile memory and other forms in the computer-readable medium, such as a read-only memory (ROM) or flash RAM. The memory is an example of the computer-readable medium.

The computer-readable medium includes permanent and non-permanent, removable and non-removable storage media. The storage medium may, by any method or technology, implement storage of information, wherein the information may be computer-readable instructions, data structures, modules of a program, or other data. Examples of a storage medium of a computer include, but are not limited to, a phase-change RAM (PRAM), a static random access memory (SRAM), a dynamic random access memory (DRAM), another type of random access memory (RAM), read-only memory (ROM), an electrically erasable programmable read-only memory (EEPROM), a flash memory or another memory technology, a compact disc read-only memory (CD-ROM), a digital versatile disk (DVD) or other optical storage, a magnetic cassette, a magnetic disk storage or other magnetic storage device, or any other non-transmission medium, for storing information that can be accessed by a computing device. As defined herein, the computer-readable medium does not include transitory computer-readable media such as modulated data signal and carrier wave.

Finally, it should be noted that: the above embodiments are only used for illustrating the technical solutions of the present disclosure, and not for limiting the same; although the present disclosure has been described in detail with reference to the foregoing embodiments, those of ordinary skill in the art should understand that: they may still make modifications to the technical solutions recited in the foregoing embodiments, or make equivalent substitutions to some or all of the technical features; and these modifications or substitutions do not make the essence of the corresponding technical solutions depart from the scope of the technical solutions of the embodiments of the present disclosure.

What is claimed is:

1. An image alignment method, comprising:
obtaining a target feature and a reference feature, the target feature comprising feature points corresponding to pixel points in a target image, and the reference feature comprising feature points corresponding to pixel points in a reference image;
obtaining a similarity feature according to the target feature and the reference feature, the similarity feature comprising similarity between each feature point in the target feature and corresponding related feature points, and the related feature points corresponding to the feature point in the target feature comprising feature points in the reference feature that have pixel coordinates the same as and adjacent to a pixel coordinate of the feature point in the target feature;
obtaining an offset between the target feature and the reference feature according to the similarity feature, the target feature, and an offset prediction convolutional layer; and
aligning the reference image with the target image according to the offset and a deformable convolutional layer.

2. The method according to claim 1, wherein related feature points corresponding to a first feature point in the target feature comprise a second feature point and feature points in a neighborhood of a first preset value of the second feature point, and
wherein the second feature point is a feature point in the reference feature that has the same pixel coordinate as the first feature point.

3. The method according to claim 1, wherein the obtaining a similarity feature according to the target feature and the reference feature comprises:
determining a first spatial domain corresponding to a third feature point in the target feature, the first spatial domain being a spatial domain formed by the third feature point and feature points in a neighborhood of a second preset value of the third feature point;
determining a second spatial domain corresponding to a fourth feature point in the reference feature, the second spatial domain being a spatial domain formed by the fourth feature point and feature points in a neighborhood of a second preset value of the fourth feature point, and the fourth feature point being a related feature point corresponding to the third feature;

calculating an outer product of feature points in each feature group to obtain an outer product of each feature group, the feature group comprising a feature point belonging to the first spatial domain and a feature point belonging to the second spatial domain, and a position of the feature point belonging to the first spatial domain in the first spatial domain being the same as that of the feature point belonging to the second spatial domain in the second spatial domain; and summing the outer products of the feature groups to obtain similarity between the third feature point and the fourth feature point.

4. The method according to claim 1, wherein the target feature is a feature obtained by performing feature extraction on the pixel points in the target image, and the reference feature is a feature obtained by performing feature extraction on the pixel points in the reference image;

or the target feature is a feature obtained by performing feature extraction on the pixel points in the target image and performing down-sampling on an extracted feature at a preset down-sampling rate; and the reference feature is a feature obtained by performing feature extraction on the pixel points in the reference image and performing down-sampling on an extracted feature at the preset down-sampling rate.

5. The method according to claim 1, wherein the obtaining an offset between the target feature and the reference feature according to the similarity feature, the target feature, and an offset prediction convolutional layer comprises:

cascading the similarity feature and the target feature on a dimension of a channel to obtain an offset prediction feature;

inputting the offset prediction feature into the offset prediction convolutional layer; and obtaining an output of the offset prediction convolutional layer as the offset between the target feature and the reference feature.

6. The method according to claim 1, wherein the target feature comprises sub-target features of a plurality of spatial scales, the reference feature comprises sub-reference features of the plurality of spatial scales, and the similarity feature comprises sub-similarity features of the plurality of spatial scales;

the obtaining an offset between the target feature and the reference feature according to the similarity feature, the target feature, and an offset prediction convolutional layer comprises:

obtaining sub-offsets between the sub-target features and the sub-reference features of the plurality of spatial scales according to the sub-similarity features of the plurality of spatial scales, the sub-target features of the plurality of spatial scales, and corresponding offset prediction convolutional layers of the plurality of spatial scales.

7. The method according to claim 1, wherein the aligning the reference image with the target image according to the offset and a deformable convolutional layer comprises:

inputting the reference feature into the deformable convolutional layer, and controlling a shape of a convolution kernel of the deformable convolutional layer by the offset;

obtaining an output of the deformable convolutional layer as an alignment result of the reference feature and the target feature; and aligning the reference image with the target image according to the alignment result of the reference feature and the target feature.

8. The method according to claim 1, wherein the target feature comprises sub-target features of a plurality of spatial scales, the reference feature comprises sub-reference features of the plurality of spatial scales, and the offset comprises sub-offsets of the plurality of spatial scales; and the aligning the reference image with the target image according to the offset and a deformable convolutional layer comprises:

obtaining alignment results of the sub-target features and the sub-reference features of the plurality of spatial scales according to the sub-offsets of the plurality of spatial scales and corresponding deformable convolutional layers of the plurality of spatial scales; and aligning the reference image with the target image according to the alignment results of the sub-target features and the sub-reference features of the plurality of spatial scales.

9. The method according to claim 1, wherein the reference image is an nth image frame of a video to be restored, and the reference image is an (n+1)th image frame of a video to be restored, where n is a positive integer.

10. An electronic device, comprising: a memory and a processor, the memory being configured to store a computer program, and the processor being configured to, when the computer program is invoked, cause the electronic device to implement an image alignment method, the method comprising:

obtaining a target feature and a reference feature, the target feature comprising feature points corresponding to pixel points in a target image, and the reference feature comprising feature points corresponding to pixel points in a reference image;

obtaining a similarity feature according to the target feature and the reference feature, the similarity feature comprising similarity between each feature point in the target feature and corresponding related feature points, and the related feature points corresponding to the feature point in the target feature comprising feature points in the reference feature that have pixel coordinates the same as and adjacent to a pixel coordinate of the feature point in the target feature;

obtaining an offset between the target feature and the reference feature according to the similarity feature, the target feature, and an offset prediction convolutional layer; and aligning the reference image with the target image according to the offset and a deformable convolutional layer.

11. The electronic device according to claim 10, wherein related feature points corresponding to a first feature point in the target feature comprise a second feature point and feature points in a neighborhood of a first preset value of the second feature point, and wherein the second feature point is a feature point in the reference feature that has the same pixel coordinate as the first feature point.

12. The electronic device according to claim 10, wherein the obtaining a similarity feature according to the target feature and the reference feature comprises:

determining a first spatial domain corresponding to a third feature point in the target feature, the first spatial domain being a spatial domain formed by the third feature point and feature points in a neighborhood of a second preset value of the third feature point;

determining a second spatial domain corresponding to a fourth feature point in the reference feature, the second spatial domain being a spatial domain formed by the fourth feature point and feature points in a neighborhood of a second preset value of the fourth feature point, and the fourth feature point being a related feature point corresponding to the third feature;

calculating an outer product of feature points in each feature group to obtain an outer product of each feature group, the feature group comprising a feature point belonging to the first spatial domain and a feature point belonging to the second spatial domain, and a position of the feature point belonging to the first spatial domain in the first spatial domain being the same as that of the feature point belonging to the second spatial domain in the second spatial domain; and summing the outer products of the feature groups to obtain similarity between the third feature point and the fourth feature point.

13. The electronic device according to claim 10, wherein the target feature is a feature obtained by performing feature extraction on the pixel points in the target image, and the reference feature is a feature obtained by performing feature extraction on the pixel points in the reference image;

or the target feature is a feature obtained by performing feature extraction on the pixel points in the target image and performing down-sampling on an extracted feature at a preset down-sampling rate; and the reference feature is a feature obtained by performing feature extraction on the pixel points in the reference image and performing down-sampling on an extracted feature at the preset down-sampling rate.

14. The electronic device according to claim 10, wherein the obtaining an offset between the target feature and the reference feature according to the similarity feature, the target feature, and an offset prediction convolutional layer comprises:

cascading the similarity feature and the target feature on a dimension of a channel to obtain an offset prediction feature;

inputting the offset prediction feature into the offset prediction convolutional layer; and obtaining an output of the offset prediction convolutional layer as the offset between the target feature and the reference feature.

15. The electronic device according to claim 10, wherein the target feature comprises sub-target features of a plurality of spatial scales, the reference feature comprises sub-reference features of the plurality of spatial scales, and the similarity feature comprises sub-similarity features of the plurality of spatial scales;

the obtaining an offset between the target feature and the reference feature according to the similarity feature, the target feature, and an offset prediction convolutional layer comprises:

obtaining sub-offsets between the sub-target features and the sub-reference features of the plurality of spatial scales according to the sub-similarity features of the plurality of spatial scales, the sub-target features of the plurality of spatial scales, and corresponding offset prediction convolutional layers of the plurality of spatial scales.

16. A non-transitory computer-readable storage medium having thereon stored a computer program which, when executed by a computing device, causes the computing device to implement an image alignment method, the method comprising:

obtaining a target feature and a reference feature, the target feature comprising feature points corresponding to pixel points in a target image, and the reference feature comprising feature points corresponding to pixel points in a reference image;

obtaining a similarity feature according to the target feature and the reference feature, the similarity feature comprising similarity between each feature point in the target feature and corresponding related feature points, and the related feature points corresponding to the feature point in the target feature comprising feature points in the reference feature that have pixel coordinates the same as and adjacent to a pixel coordinate of the feature point in the target feature;

obtaining an offset between the target feature and the reference feature according to the similarity feature, the target feature, and an offset prediction convolutional layer; and aligning the reference image with the target image according to the offset and a deformable convolutional layer.

17. The non-transitory computer-readable storage medium according to claim 16, wherein related feature points corresponding to a first feature point in the target feature comprise a second feature point and feature points in a neighborhood of a first preset value of the second feature point, and wherein the second feature point is a feature point in the reference feature that has the same pixel coordinate as the first feature point.

18. The non-transitory computer-readable storage medium according to claim 16, wherein the obtaining a similarity feature according to the target feature and the reference feature comprises:

determining a first spatial domain corresponding to a third feature point in the target feature, the first spatial domain being a spatial domain formed by the third feature point and feature points in a neighborhood of a second preset value of the third feature point;

determining a second spatial domain corresponding to a fourth feature point in the reference feature, the second spatial domain being a spatial domain formed by the fourth feature point and feature points in a neighborhood of a second preset value of the fourth feature point, and the fourth feature point being a related feature point corresponding to the third feature;

calculating an outer product of feature points in each feature group to obtain an outer product of each feature group, the feature group comprising a feature point belonging to the first spatial domain and a feature point belonging to the second spatial domain, and a position of the feature point belonging to the first spatial domain in the first spatial domain being the same as that of the feature point belonging to the second spatial domain in the second spatial domain; and summing the outer products of the feature groups to obtain similarity between the third feature point and the fourth feature point.

19. The non-transitory computer-readable storage medium according to claim 16, wherein the target feature is a feature obtained by performing feature extraction on the pixel points in the target image, and the reference feature is a feature obtained by performing feature extraction on the pixel points in the reference image;

or the target feature is a feature obtained by performing feature extraction on the pixel points in the target image and performing down-sampling on an extracted feature at a preset down-sampling rate; and the reference feature is a feature obtained by performing feature extraction on the pixel points in the reference image and performing down-sampling on an extracted feature at the preset down-sampling rate.

20. The non-transitory computer-readable storage medium according to claim 16, wherein the obtaining an offset between the target feature and the reference feature according to the similarity feature, the target feature, and an offset prediction convolutional layer comprises:

cascading the similarity feature and the target feature on a dimension of a channel to obtain an offset prediction feature;

inputting the offset prediction feature into the offset prediction convolutional layer; and obtaining an output of the offset prediction convolutional layer as the offset between the target feature and the reference feature.

* * * * *